United States Patent [19]

Jensen

[11] 4,017,287

[45] Apr. 12, 1977

[54] CONTROL APPARATUS AND SYSTEM FOR CLOSELY SPACED HEATING ELEMENTS FOR FORMING GLASS FIBERS AND METHOD OF USING SAME

[75] Inventor: Thomas H. Jensen, Murrysville, Pa.

[73] Assignee: PPG Industries, Inc., Pittsburgh, Pa.

[22] Filed: Jan. 20, 1976

[21] Appl. No.: 650,818

Related U.S. Application Data

[63] Continuation of Ser. No. 563,930, March 31, 1975, Pat. No. 3,969,098, which is a continuation-in-part of Ser. No. 531,942, Dec. 12, 1974, abandoned, which is a continuation-in-part of Ser. No. 320,381, Jan. 2, 1973, abandoned.

[52] U.S. Cl. .................................. 65/2; 65/12; 65/29; 65/162
[51] Int. Cl.² .................................. C03B 37/02
[58] Field of Search ............ 65/1, 2, 11 W, 12, 162, 65/29

[56] References Cited

UNITED STATES PATENTS

| 3,625,025 | 12/1971 | Jensen ........................................ 65/2 |
| 3,649,231 | 3/1972 | Trethewey .......................... 65/12 X |
| 3,697,241 | 10/1972 | Strickland et al. ...................... 65/2 |
| 3,829,301 | 8/1974 | Russell .............................. 65/12 X |

*Primary Examiner*—Robert L. Lindsay, Jr.
*Attorney, Agent, or Firm*—Alan T. McDonald; John E. Curley

[57] ABSTRACT

In an electrical heating element apparatus and control system for tubular glass fiber bushings wherein a plurality of bushings are each individually temperature controlled by a compact power supply and control system and means are provided for mounting and holding the orifice tube fiber units in proper relationship, while at the same time providing the required electrical connection to them. The heating elements or the orifice tubes are connected in parallel across the secondary of a single transformer, and individual control elements are connected in series with each element on the secondary side of the transformer. A special fluid control system is used to provide for differential flow of cooling fluid across the face of the orifice tube. The cooling fluid is controlled along the length of the orifice tube by segmented units, that can be individually controlled to provide for varying cooling fluid flow along a given length of the orifice tube.

3 Claims, 5 Drawing Figures

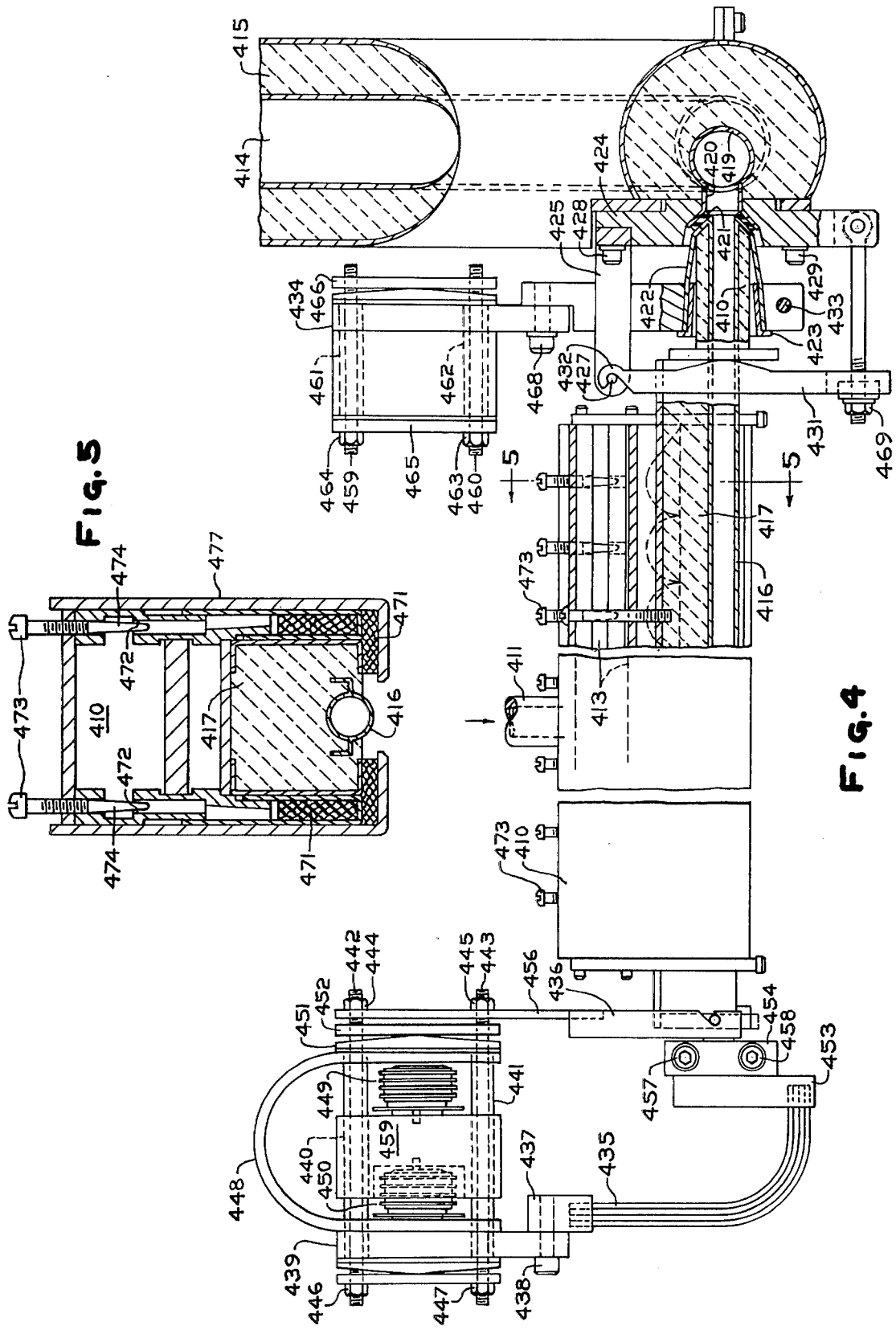

CONTROL APPARATUS AND SYSTEM FOR CLOSELY SPACED HEATING ELEMENTS FOR FORMING GLASS FIBERS AND METHOD OF USING SAME

CROSS-REFERENCE TO RELATED APPLICATIONS

This application is a continuation of application Ser. No. 563,930, filed Mar. 31, 1975, now U.S. Pat. No. 3,969,098, granted July 13, 1976 which is a continuation-in-part of application Ser. No. 531,942, filed Dec. 12, 1974, now abandoned, which is a continuation-in-part of application Ser. No. 320,381, filed Jan. 2, 1973, now abandoned.

BACKGROUND OF THE INVENTION

In conventional fiber glass producing arrangements, molten glass is delivered to an electrically heated bushing which includes a plurality of tips having orifices therethrough for the passage of glass streams. The glass streams are attenuated into fibers which are grouped together as a strand and collected as a package. Generally, the bushings are constructed of an alloy, such as 90 percent platinum and 10 percent rhodium. The tips are painstakingly built up by dropping molten alloy onto a bushing plate, and then drilling the built-up alloy to form the orifices. This arrangement, although commonly used, has a serious limitation in that only a relatively small number of orifices can be provided in a given space.

Another and later approach is to drill small, closely spaced holes in the wall of a metal pipe and deliver molten glass under pressure to the pipe so as to extrude glass through the holes. It has been found that the number of holes per unit of area of pipe far exceeds the number of tips for a like area of a conventional bushing. Further, the cost of an orifice tube of the type just described is considerably less than the cost of conventional bushing. In such devices, it is customary to provide at least a partial shroud for the orifice tube and to deliver a controlled atmosphere to the shroud to envelop the tube and be discharged near the holes to provide cooling to the filaments and, for certain embodiments protect the tube against oxidation.

By utilizing high pressures up to perhaps several hundred pounds per square inch in the orifice tube, as opposed to conventional one pound per square inch pressure, the fibers may be attenuated from smaller orifices while producing less tension in the filament than was the case with prior, larger, orifice bushings producing an equivalent filament at comparable speeds. Such as high pressure orifice tube fiberizing unit is disclosed and claimed in U.S. Pat. No. 3,625,025 assigned to the assignee of the present application.

In conventional fiberizing systems, the bushing generally requires from 1500 to 3000 amperes at operating conditions. To provide this power, a step-down transformer is generally used to provide a high current, low voltage circuit from which the current is supplied to the bushings, with the high-voltage side of the transformer providing the control. Thus in conventional systems the primary side of the transformer may include a saturable core reactor or a solid state semiconductor system for regulating the flow of power to the bushing to control the temperature thereof. However, because of the physical size of the components of such a control system, this means of control becomes extremely impractical when considered for load elements such as the orifice tubes described above, particularly when they are placed in close proximity, for the small size of the orifice tube only requires about one-tenth the space required for a comparable conventional bushing. Further, the orifice tube requires only about one-fifth the power to operate than is required for conventional devices and thus the size of the conventional power supply and controller is not necessary for orifice tube fiberizers.

It has been conventional practice in operating orifice tubes of this type to surround the tubes with a fluid cooling system typically an air supply system to assist in providing close temperature control over the orifices. This is typically accomplished with a plenum chamber constructed and arranged to deliver the air across the orifice tube from both sides from one end to the other. Since some orifices along the length may require more or less cooling fluid to operate effectively, this system has been found to be unsatisfactory in some instances.

SUMMARY OF THE INVENTION

Accordingly, it is an object of the present invention to provide an improved means for regulating the temperature of an orifice tube fiberizing unit.

It is another object of the invention to provide a compact, convenient, more efficient heating control system for glass fiber orifice tubes while providing more individual control of the cooling of the orifice tips along the length of the tube.

Another object of the present invention is to provide an improved heating control apparatus which is adapted to the reduced power requirements produced by the small size of an orifice tube fiberizing unit, and which is designed to provide means for conveniently mounting and holding the fiberizing units in proper relationship.

A further object of the invention is to provide a heating element control system for a plurality of glass fiber orifice tubes, wherein the heating elements of all of the tubes are connected in parallel with the secondary winding of a single supply transformer, with each element being individually controlled at the transformer secondary.

Briefly, the arrangement of the present invention comprises an orifice tube fiberizing unit mounted in compression between a combination clamp and spring-loaded electrical connector and a high pressure glass source which provides molten glass for the unit. The fiberizing unit includes a tube having a multitude of small orifices formed in a portion of its surface through which a heat softened material such as glass is extruded. At one end of the tube is a flanged connector designed to seat in a mating recess on the glass source, while the other end of the orifice tube is engaged by a clamp which includes an electrical connector for the tube. The clamp and the connector are adjustably attached to a fixed bus bar which serves both to provide a rigid mount for the entire assembly and to supply power to the unit.

The bus bar is connected at one end to a transformer of sufficient power capacity to handle all of the fiber units that can be secured to the bus bar. Embedded within the bus bar and contacting the electrical connector for each unit is a pair of half-wave thyristors through which flows the current from the bus bar to the connector, and which serve to regulate the current to provide the power required to maintain the desired temperature in the orifice tube. The bus bar and connector assembly are water cooled to protect the semiconductive thyristors, and the connector includes a finned cooling block to prevent overheating.

A thermocouple on each orifice tube provides a signal proportional to its temperature, this signal being fed to a suitable control system to produce an output which regulates the operation of the corresponding thyristors. The control system, which may be a conventional three mode system, provides the necessary control action to maintain each individual orifice tube at a predetermined level, or set point. Each of the many orifice tubes that may be connected to a single bus bar are connected in electrical parallel to the secondary of the transformer, and each tube is provided with an individual controller to regulate the power expended in accordance with the requirements of the respective tube. The power and control system is compact and efficient, allowing close spacing of adjacent orifice tube units, and is operable from the secondary of a power supply transformer, thus substantially reducing the bulk and expense of the power and control system.

The orifice tube is surrounded on either side by a cooling fluid delivery system which delivers fluid across the long axis of the orifice tube. The fluid delivery system is provided with means to adjust the quantity of fluid delivered across a given segment of the tube to thereby provide for variable cooling along the length of the orifice tube at given points to allow for more individual control of cooling at the multiplicity of orifices.

BRIEF DESCRIPTION OF THE DRAWINGS

The foregoing and additional objects, features and advantages of the present invention will be apparent to those of skill in the art from a consideration of the following detailed description, taken with the accompanying drawings, in which:

FIG. 4 is a front elevation in partial section of another embodiment of the invention having an orifice tube and electrical connection thereto as well as the glass delivery system; and FIG. 5 is a cross section of FIG. 4 taken along line 5—5 of FIG. 4 to show the internal fluid control passages in the air chamber 413 of FIG. 4.

DESCRIPTION OF A PREFERRED EMBODIMENT

Figure 1:
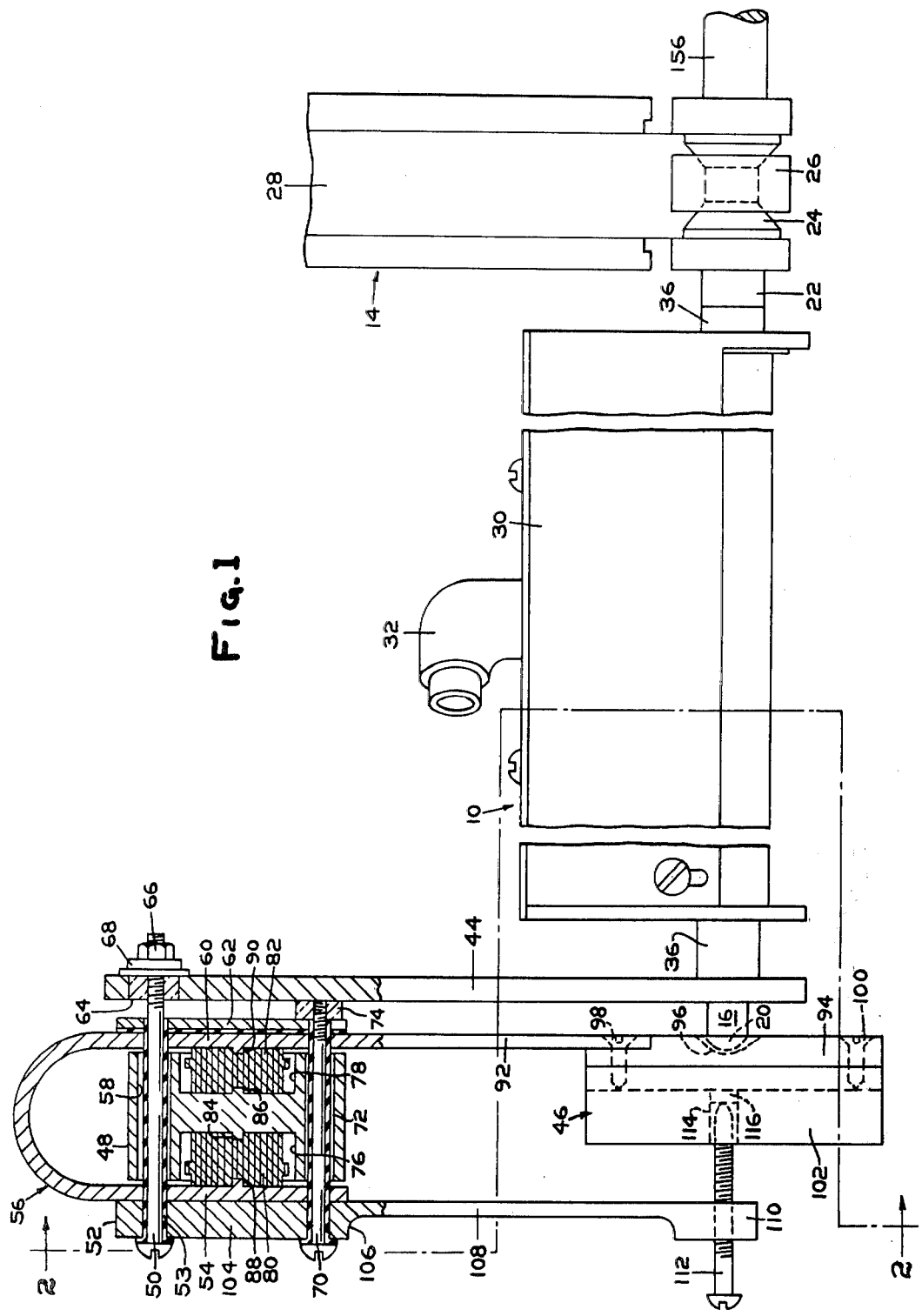
FIG. 1 is a front elevation in partial section of an orifice tube, clamp, and electrical connector in accordance with the present invention as viewed along line 1—1 of FIG. 2.
Figure 2:
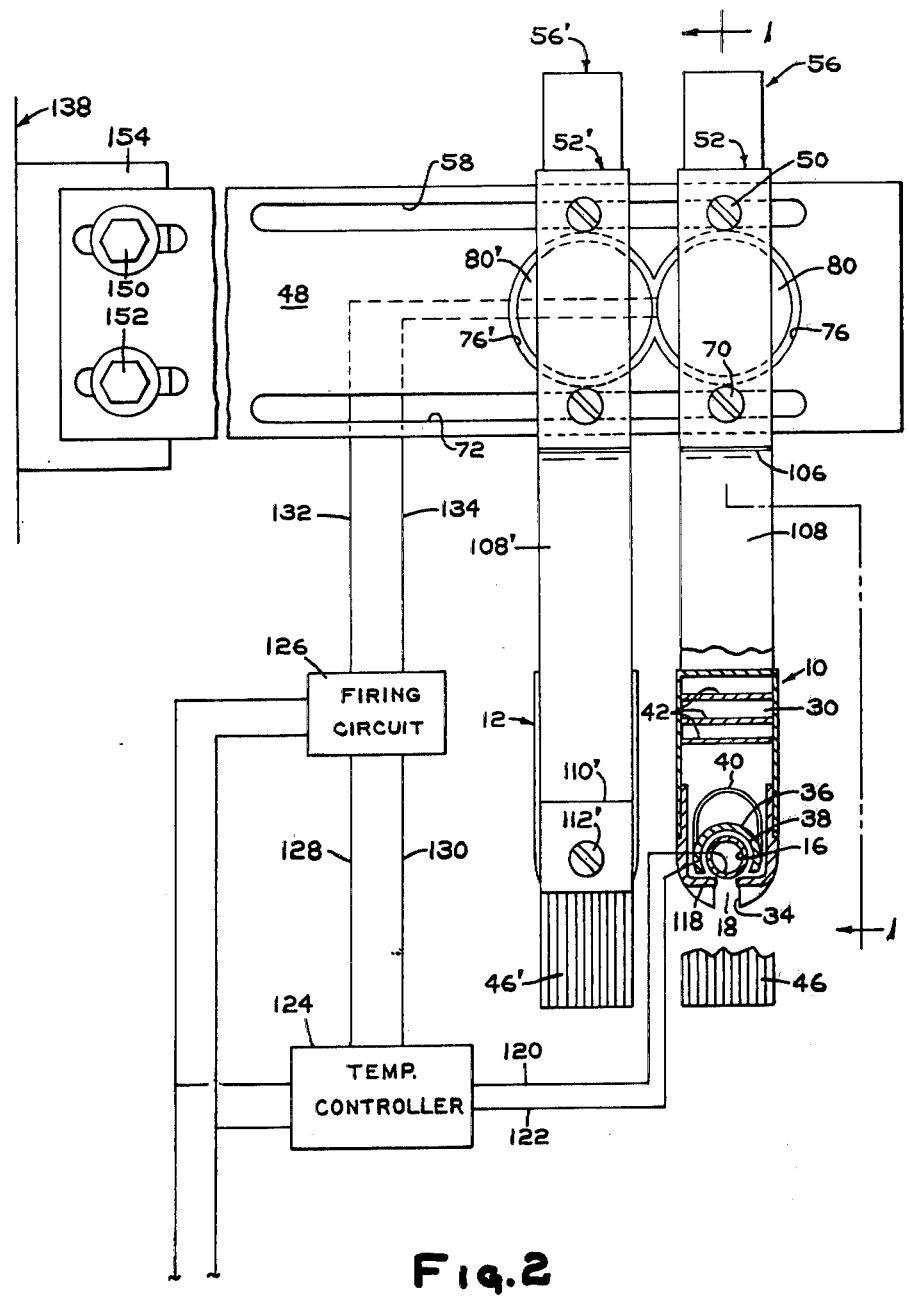
FIG. 2 is a side elevation of the device of FIG. 1 along line 2—2 of FIG. 1 in partial section and showing in addition a second orifice tube clamp and connector assembly similar to the assembly of FIG. 1.

Turning now to a consideration of FIGS. 1 and 2, there are illustrated at 10 and 12 two orifice tube fiberizing units each having a plurality of orifices therein for extruding streams of molten glass delivered under pressure to the tubes from a pressure source 14. As described more fully in the aforesaid U.S. Pat. No. 3,625,025, the orifice tube 16 of fiberizing unit 10 is made of platinum or platinum alloy with a plurality of orifices being formed in the lower portion of its wall, generally at 18, in a closely spaced array. One end 20 of tube 16 is closed, while the other end 22 is open and provided with a flanged coupler 24 to mate with a complementary coupler 26 on a supply conduit 28 which serves to supply molten glass to the tube. The tube 16 is heated by passing an electric current therethrough, as will be described.

The orifice tube 16 is shrouded by a manifold 30 to which cooling air is delivered by way of an inlet conduit 32 (FIG. 1). The manifold partially covers the orifice tube and terminates at an opening 34, the edges of which are slightly spaced from the orifice tube for the passage of cooling air as may be seen in the sectional view of the fiberizing unit in FIG. 2. This air flows down through the manifold 30 and is blown from opposite sides across the orifices formed at 18, eventually following the streams of glass and the resultant fibers down and out opening 34. The air cools the fibers as they are being formed, and insures stable attenuation of the fibers.

To protect the orifice tube from distorting or rupturing under the relatively high pressure exerted on it by the glass feed, a shield tube 36 partially surrounds tube 16, but is separated therefrom by a layer of insulating material 38 which serves to isolate tube 16 from the cooling air in manifold 30. The shield tube 36 and the insulating material may extend beyond the ends of the mainfold 30, as shown in FIG. 1, to cover the tube 16 outside the manifold. An air shield 40 over the shield tube 36 further assists the shield tube in diffusing the cooling air, so that cooling of the orifice tube is avoided. With this structural arrangement, variations in the flow rate or temperature of the cooling air have substantially no effect on the temperature of the orifice tube. In order to diffuse the air flowing out of manifold 30 and distribute it along the length of the orifice tube, a plurality of diffusing screens and baffles 42 are located within the manifold between the supply tube 32 and the manifold outlet 34 as is more fully described in said U.S. Pat. No. 3,625,025.

Because of the small size of the orifice tube construction, it is possible to obtain substantial savings in the space required for producing a given number of fibers; in some cases up to ten orifice tubes can be used in the space normally required for a single conventional bushing producing a comparable amount of fiber. In order to take advantage of this considerable space savings, the present invention contemplates the provision of a unique means for mounting the orifice tube, which means include a novel electrical connector arrangement and incorporates an electrical control circuit that takes advantage of the substantially reduced power requirements of the orifice tube construction. As illustrated in FIGS. 1 and 2, the fiberizing unit 10 is secured at one end to the source 14 of high-pressure molten glass, by means of the flanged connector 24. The opposite end of the unit is secured in an elongate clamping bar 44, with the end 20 of orifice tube 16 passing therethrough for contact with a spring-loaded electrical connector 46. The connector is pressed against the end of the tube to make a good electrical contact, whereby an electrical current of selected amplitude is introduced into the orifice tube, flowing through the tube to a ground point at connector 26 to heat the orifice tube to the selected temperature.

Clamping bar 44 is adjustably attached to, but is electrically insulated from, a fixed bus bar 48 which serves to provide a rigid mount for a plurality of fiberizing units as well as a common power source for the units so connected. A bolt 50 secures the clamping arm in place, the bolt passing through a spring arm 52 (FIG. 1), a first leg portion 54 of a curved contact arm 56, an upper elongated slot 58 in the bus bar, a second leg portion 60 of the contact arm 56, an opening in a spacer plate 62, and the clamping arm. The bolt 50 is surrounded by an electrically insulative sleeve 53. An electrically insulative bushing 64 spaces the bolt 50 from arm 44, and a nut 66 and washer 68 secure the bolt. A second bolt 70 provides a pivot point for the clamping arm, bolt 70 being spaced from bolt 50 and passing through spring arm 52, leg portion 54 of the contact arm, through a lower elongated slot 72 in the bus bar, through the second leg portion 60 of arm 56, and through spacer plate 62. The end of bolt 70 is threaded into an electrically insulating pivot block 74 which may be secured to spacer plate 62. Bolt 70 serves to clamp the spring arm and contact arm assembly together and to bus bar 48, as well as to provide a pivot point for clamp arm 44. When nut 66 is threaded onto bolt 50, it tends to pull the top of clamp arm 44 (as seen in FIG. 1) toward the curved contact arm 56 and the bus bar 48. The middle portion of the clamping arm abuts the insulating spacer 74, which prevents it from coming into contact with the contact arm; accordingly, tightening of nut 66 tends to move the lower portion of arm 44 away from contact arm 56, and into contact with the fiberizing unit 10. Thus, the fiberizing unit may be firmly clamped between the bus bar 48 and the glass supply source 14 by the clamping arm, thereby securing the fiberizing unit in a selected position. The slots 58 and 72 in the bus bar allow adjustment of the exact location of the fiberizing unit and allow close spacing of adjacent units, as may be seen in FIG. 2. Further, an individual fiberizing unit may easily be removed or installed without disturbing adjacent units, merely by loosening nut 66 and by releasing the electrical contact 46.

Contact arm 56 is generally "J"-shaped, the J-shaped arm being inverted and positioned over the bus bar 48 so that the shorter depending leg portion 54 is adjacent one side of the bus bar and the longer depending leg portion is adjacent the other side of bus bar 48. Mounted in corresponding depressions 76 and 78 formed on opposite sides of bus bar 48 are a pair of thyristor elements 80 and 82, respectively. These elements are thicker than the depth of the depressions in which they are located so that one surface of each thyristor extends above the surface of the corresponding side of the bus bar. Thus, the outer surface of thyristor 80 extends above the bus bar at depression 76 and is adapted to contact the inner surface of leg portion 54 of connector 56. Similarly, the outer surface of thyristor 82 extends above the surface of the bus bar 48 at depression 78, and is adapted to contact the inner surface of leg portion 60 of the connector arm.

Protrusions 84 and 86 are formed on opposite sides of the bus bar in the center of depressions 76 and 78, respectively, and fit into corresponding hollows in the center of the thyristors 80 and 82 to center the thyristors in the bus bar depressions. The contact arm 56 similarly is provided with protrusions 88 and 90 which engage corresponding hollows in the outer surfaces of thyristors 80 and 82 whereby the contact arm assembly is positioned with respect to the thyristors and bus bar. The bolts 50 and 70 hold the various elements tightly together in firm electrical contact, clamping the inner surfaces of the contact arm against the outer surfaces of the thyristors, and holding the thyristors tightly against the bus bar, whereby current may flow from the bus bar through one or the other of thyristors 80 and 82, depending on which is conductive, into the corresponding leg of contact arm 56.

The longer leg 60 of contact arm 56 extends downwardly and supports at its lower end 92 the electrical connector 46 which is adapted to provide electrical contact with orifice tube 16. Connector 46 includes a contact block 94 secured to the end 92 of leg 60, the block having on one side a cavity 96 adapted to receive the closed end 20 of the orifice tube. Secured to the other side of block 94 by means of screws 98 and 100 is a finned cooling block 102 which insures that the contactor will remain within acceptable temperatures, while yet avoiding excessive cooling of the orifice tube.

Adjustment of the pressure of connector 46 against orifice tube 16 is by means of spring arm 52, the upper end 104 of which is secured tightly to the bus bar by bolts 50 and 70. The spring arm tapers down at shoulder 106 to form a thin, relatively flexible central portion 108. The spring arm extends downwardly as far as the orifice tube, with the bottom portion 110 being thickened and provided with a threaded hole through which extends a pressure adjusting screw 112. This screw is aligned approximately with the axis of the orifice tube, and extends through the lower portion 110 of the spring arm into contact with the connector block 46. Preferably, the end of the screw extends into an opening 114 formed in the cooling fins 102 and contacts a pad 116 in the bottom thereof.

When the screw 112 is threaded into the spring arm its end presses against the contact block, tending to separate the block 46 from the end 110 of the spring arm. The spring action of arm 52 tends to force contact block 46 against the end of the orifice tube, with a force depending upon the strength of the arm 52 and the amount that the adjusting screw is threaded into the lower end portion 110.

As indicated in FIG. 2, a temperature measuring device such as, for example, a Pt-PtRh thermocouple, 118 is placed on the orifice tube 16 to provide an output signal on lines 120 and 122 proportional to the temperature of the glass being extruded. A control system including a temperature controller 124 provides the necessary control action to maintain the orifice tube 16 at a predetermined level, or set point. The controller regulates a thyristor firing circuit 126 in known manner by way of lines 128 and 130, with the output of the firing circuit being applied by way of lines 132 and 134 to thyristors 80 and 82, as shown in FIG. 3.

The control system is of conventional type, and preferably is of the three mode type well known in the prior art. As shown in FIGS. 2 and 3, each of the fiberizing units 10, 12, etc., are substantially identical, and are individually controlled by corresponding control systems. Thus, the unit 12 is shown in FIG. 2 as being mounted closely adjacent unit 10, with all of the units being adjustably secured to the bus bar 48 by means of slots 58 and 72. In practice, it has been found that numerous units may be placed in electrical parallel on a single bus bar, with the center-to-center spacing being on the order of 1½ inches or less. In FIG. 2 and FIG. 3, the elements of fiberizing unit 12 that are duplicates of similar elements on fiberizing unit 10 are similarly numbered, but primed.

Figure 3:
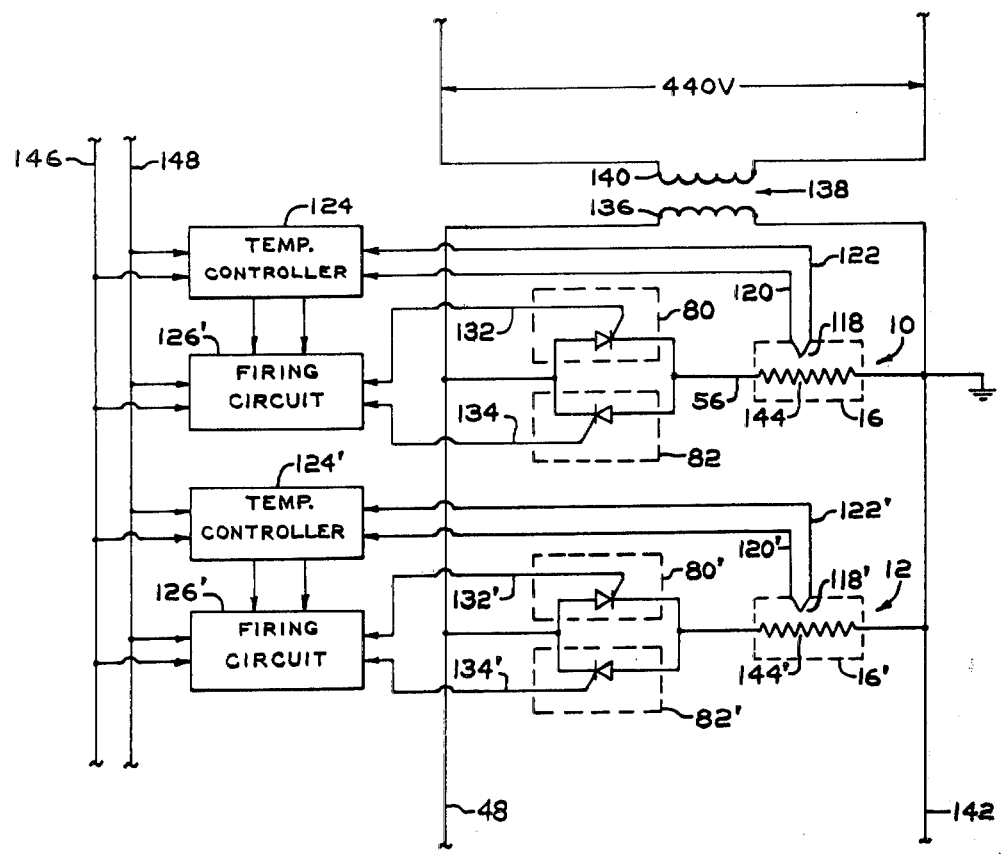
FIG. 3 is a partial schematic and partial block diagram of the control system of the present invention.

As shown in FIG. 3, the bus bar 48 is connected to the secondary winding 136 of a power supply transformer 138 selected to have a rating sufficient to handle the maximum requirements all of the fiberizing units that can be connected to the bus bar. The transformer primary winding 140 is energized from a voltage source (not shown) which may be variable to provide the desired voltage level on bus bar 48. Each of the fiberizing units 10, 12, etc., are connected across the transformer secondary winding 136, being connected at one end to bus bar 48 and at the other end to a ground reference point 142 or by means of grounded coupler 26. The two thyristors 80 and 82 are half wave devices connected in parallel with each other with one end of the thyristor combination being connected to bus bar 48 and the other end of the combination being connected through connector 56 to the orifice tube 16, represented here as a heating resistance element 144.

Thermocouple 118 senses the temperature of orifice tube 16, and provides a single to three-mode temperature controller 124, which may be energized by power lines 146, 148, and which compares the measured temperature signal with a precision reference voltage representing the set point, or desired temperature. Any difference between these signals is amplified and applied to a conventional three mode control device, which feeds a signal to the firing circuit 126 to regulate the length of time during each half cycle of the AC input voltage from transformer 138 each thyristor will conduct. This regulation is carried out by applying appropriate control signals to the gate circuit of the thyristors 80 and 82 by way of lines 132 and 134, respectively, in known manner. In similar manner, each fiberizing unit that may be connected to transformer 138 is connected to the secondary, and is individually controlled, whereby fully independent control is obtained for each orifice tube.

It will be seen from the foregoing that after securing the desired number of fiberizing units to the bus bar, the voltage at the secondary of the transformer is adjusted to a level that will provide sufficient excess voltage to allow adequate control for all of the units, and the voltage is thereafter held constant. When the temperature of the orifice tube 16 deviates from the set point, the controller 124 acts through the firing circuit 126 to cause the thyristors 80 and 82 to alternately conduct, during a larger or smaller portion of each half cycle of the supply current, as the case may be, thereby passing a controlled amount of current through the orifice tube. This current regulation adjusts the temperature of the orifice tube until the set point is reached, and the overall effect is to maintain the orifice tube at the desired set point. As long as the primary power system maintains a constant voltage across secondary winding 136, each individual fiberizing unit may be regulated from zero to maximum power, independently of adjacent units.

The bus bar 48 is shown in FIG. 2 as being secured by means of suitable bolts 150 and 152 to a stud 154 on transformer 138, which stud provides a connection to the secondary winding and thus serves as an output terminal for the transformer.

In FIG. 4, an apparatus similar to FIG. 1 is shown but having certain innovative modifications therein in the electrical system utilized to feed current to closely spaced orifice tubes. Thus in FIG. 4 there is shown a glass delivery tube 414 suitably insulated with refractory 415 which delivers molten glass from a furnace, not shown, to a horizontally oriented manifold tube 419 shown in section. Along one side of the horizontal tube 419 there is provided a plurality of cone shaped nipples, one of which is shown as 420 in section. These nipples 420 are shaped to provide a mating, locating and sealing surface between the orifice tube 416 and the molten glass source 414, and thereby insure the constant supply of molten glass to the tube 416. Surrounding the nipple 420 is a ring member 424 constructed to firmly hold nipple 420 in a surrounding relationship and provide with a lower pivoted arm member 426. The ring 424 has secured to its upper end through bolt 428 arm 425 provided at its free end with a stationary pin member 427 which protrudes inwardly. A clamp 431 is provided which engages orifice tube 416 and is provided on its upper extremity with a curved slot 432 constructed to engage the pin 427. At its lower end arm 431 is provided with a slot for insertion of arm 426 therein. The arm 426 is threaded to receive nut 469 which when tightened urges clamp 431 in a direction toward the molten glass source which in turn firmly seals orifice tube 416 against the nipple 420. The orifice tube 416 is fitted with a circular conductor 422 which has a corresponding cone shape at its point of connection to orifice tube 416 and extends back along the tube. An electrical water-cooled clamp 433 surrounds the circular conductor 422 with a corresponding support ring 423 to provide necessary clamping support. An annular space is provided between the ring 423 and orifice tube 416 to allow sufficient insulation 470 and insure unrestricted movement of the orifice tube for a sealed connection with the glass source. An insulator 421 is provided between the conductor ring 422 and the nipple 420. This insulator 421 isolates the electrical system used to individually control the orifice tube 416 in accordance with this invention from the electrical supply, not shown, which is used to maintain the glass in the glass delivering system in a molten condition.

Orifice tube housing 410 is physically positioned at its extremity opposite the glass source by a hanger 436 secured to bolts and 443 by a connector plate which supports the entire assembly. The end of tube 416 is firmly connected by a clamp 454 to a connector 453 having leads 435 connected thereto. Leads 435 are held at their other extremity in a conductive block 437 bolted to plate 439 which plate is in electrical contact with connector 448. The connector 448 is horseshoe shaped and is in electrical communication with thyristors 449 and 450. Plate 451 and 452 on the right side of the unit and plates of similar design on the left side of the unit, through bolts 442 and 443 and their associated nuts 444, 446, 445 and 447 clamp tightly against the bus bar 448 to insure good electrical contact between the thyristors 449 and 450 and the connector 448. Bolt 442 is provided with an insulated sleeve 440 and bolt 443 with a similar insulated sleeve 441. This clamping also insures good electrical contact between the connector 448 and the electrically conductive plate 439 which feeds current from the transformer, not shown, to the orifice tube 416.

Current at the other end of tube 416 is passed through the ring 422 to the clamp 433 secured to connector 434 through bolt 468. This unit is similar to the electrical system utilized in the embodiment of the invention as is shown in FIG. 3. Thus, the bus bar 448 is connected to the secondary winding 136 of a power supply transformer 140. The winding 140 is of course energized by a voltage source not shown and which may be adjustable to provide the desired voltage level on bus bar 448. The fiberizing unit 416 is connected across the transformer secondary winding 136, being connected to bus bar 448 at one end and terminal 434 at the other end.

In this embodiment, of course, thyristors 449 and 450 are half wave devices connected in parallel with each other with one end of the thyristor combination connected to bus bar 459 and the other end of the combination being connected through connector 448 to the orifice tube 416.

The operation of the control circuitry is as described hereinbefore in discussing FIG. 3.

While only one fiberizing tube 416 is shown in FIG. 4 it is, of course, understood that the plurality of these tubes may be used with each tube 416 being controlled from a common power transformer by providing each tube with a thyristor system such as shown above.

It will be understood that, if desired, various additional cooling means may be provided for the apparatus to prevent overheating of the thyristors. Thus, for example, cooling ducts may be provided in the bus bar 459 through which cooling water may be circulated. As may be seen in FIG. 1, the source 14 of molten glass may feed not only the parallel orifice tubes 10 and 12, but an additional row of tubes 156 extending in the opposite direction from the feeder. A similar arrangement can be made in FIG. 4 by providing suitable nipples 420 on the opposite side of the glass delivery tube 419.

As can be seen from the drawings, particularly FIGS. 4 and 5, the orifice tube 416 is insulated by refractory 417 in an air manifold housing 410. The manifold housing 410 is provided with an air supply inlet 411 and air chamber 413. The air in chamber 413 is distributed along the orifice tube 416 by passing the air through the chamber 413 down through the restricted air passages 472 through screens 471 and out across the orifice tube 416. The screw type elements 473 are used to control the opening of the passages 472 by inserting the tapered end 474 of each of the elements 473 to any desired length into the passages 472 thus increasing or decreasing the amount of air that can be fed through each of these passages 472. The elements 477 are placed in the plenum or air chamber 413 in surrounding relationship to the orifice tube and along the length of the chamber 413 in side by side relationship to each other. Each of the units 473 control the orifices across the tube 416 for a length of about 1.5 inches (3.81 centimeters). Sufficient of the elements 477 are provided for a given length of orifice tube 416. Thus, for example, with an orifice tube 416 having a length of 18 inches (45.72 centimeters) eleven elements 477 are used so that incremental lengths of 1.5 inches (3.81 centimeters) are individually controlled. When any discrepancy or erratic performance of a group of orifices along the length of tube 416 is observed, the cooling at that location can be readily adjusted by moving the pin 474 into or out of its mating passage 472 until the condition is corrected. Thus, a method is provided to achieve more accurate temperature control over the multiplicity of orifices contained along the elongated orifice tube 416 to insure more uniform operation thereof.

In lieu of the air distribution system described above, the system described hereinbefore with respect to FIG. 2 can be employed.

Thus there has been disclosed an apparatus for providing fully independent temperature control of a multitude of closely spaced heating elements by a technique which eliminates the need for space-consuming step-down transformers and saturable reactors for each unit, as now used on conventional bushing system. A single power source is used to power a plurality of such elements, through a connector arrangement which provides means for conveniently and quickly removing and installing individual fiberizing units. Although the invention has been described and illustrated in terms of a preferred embodiment thereof, it will be apparent to those skilled in the art that numerous variations and modifications can be made without departing from the true spirit and scope thereof, as defined in the following claims.

I claim:

1. In a glass fiber forming system in which glass fibers are formed from an elongated tubular bushing operating under positive pressure other than glass head pressure and in which the elongated tubular bushing is electrically controlled, the improvement comprising providing along incremented lengths of the bushing gaseous cooling fluid means which are adjustable, and adjusting one or more of said means in response to a need for more or less gaseous cooling fluid to corresponding incremented lengths during the operation of the bushing.

2. In an elongated tubular fiber glass bushing having a means for supplying a gaseous cooling fluid which projects the gaseous fluid across the surface of said elongated tubular bushing during operation thereof, the improvement comprising a plurality of gaseous fluid adjustment means positioned along the length of said elongated tubular bushing, said adjustment means including individually controlled units for incremented lengths of said elongated tubular bushing, each of said adjustment means being capable of delivering gaseous cooling fluid from a common gaseous fluid supply means in varying amounts across the incremented length of said elongated tubular bushing with which each is associated.

3. The apparatus of claim 1 wherein each of said individually controlled units is provided with a means to filter said gaseous cooling fluid before releasing it to said elongated tubular bushing.

* * * * *